United States Patent
Chang et al.

(10) Patent No.: US 7,199,622 B2
(45) Date of Patent: Apr. 3, 2007

(54) INTERLEAVING CONTROL TYPE INVERTER

(75) Inventors: Song-Chu Chang, Longtan Township, Taoyuan County (TW); Xin-zhong Lin, Longtan Township, Taoyuan County (TW); Hsiu-Wei Chang, Longtan Township, Taoyuan County (TW)

(73) Assignee: Chung Shan Institute of Science and Technology, Taoyuan County (TW)

( * ) Notice: Subject to any disclaimer, the term of this patent is extended or adjusted under 35 U.S.C. 154(b) by 160 days.

(21) Appl. No.: 11/002,153

(22) Filed: Dec. 3, 2004

(65) Prior Publication Data
US 2006/0120121 A1 Jun. 8, 2006

(51) Int. Cl.
*H03K 5/01* (2006.01)
(52) U.S. Cl. .................................... 327/100
(58) Field of Classification Search ............. 363/71, 363/72, 132; 327/415, 416, 365, 100, 296
See application file for complete search history.

(56) References Cited

U.S. PATENT DOCUMENTS 6,965,219 B2 * 11/2005 Brooks et al. .............. 323/282

* cited by examiner

*Primary Examiner*—Shawn Riley
(74) *Attorney, Agent, or Firm*—Rabin & Berdo, P.C.

(57) ABSTRACT

An interleaving control type inverter includes a waveform generator to generate a predetermined waveform; a plurality of first signal generators to receive the predetermined waveform and a phase voltage to generate a first control signal and a second control signal corresponding to the phases of the phase voltage; a second signal generator to receive the predetermined waveform and generate a first interleaving signal and a second interleaving signal; a plurality of first multiplexers to receive the first interleaving signal and process the first control signal to become a plurality of first control signals; a plurality of second multiplexers to receive the second interleaving signal and process the second control signal to become a plurality of second control signals; and a plurality of power transistors that switch according to the first control signals and the second control signals.

22 Claims, 14 Drawing Sheets

INTERLEAVING CONTROL TYPE INVERTER

BACKGROUND OF THE INVENTION

1. Field of Invention

The invention relates to an inverter, and particularly to an interleaving control type inverter.

2. Related Art

Referring to FIGS. 1 and 2, a conventional three-phase inverter aims to transform DC power Vdc to three-phase AC power to drive a load 100. The three-phase AC inverter consists of a plurality of transistors coupled in parallel. Transistors 111 and 112 are coupled in parallel, transistors 113 and 114 are coupled in parallel, transistors 115 and 116 are coupled in parallel, transistors 121 and 122 are coupled in parallel, transistors 123 and 124 are coupled in parallel, and transistors 125 and 126 are coupled in parallel. These transistors are generally insulated gate bipolar transistors (IGBTs). The gates of the transistors 111~116 are controlled by first control signals PWM_R1, PWM_S1 and PWM_T1, namely, the upper arm control signals corresponding respectively to R, S and T phases. The gates of the transistors 121–126 are controlled by second control signals PWM_R2, PWM_S2 and PWM_T2, namely, the lower arm control signals corresponding respectively to R, S and T phases. Taking the R phase for an example, the transistors 111, 112, 121 and 122 are driven respectively by gate drivers 131~134.

Parallel coupling is accomplished and controlled by coupling two sets of IGBTs of the same model number. Only one gate control signal is required to drive two transistors that are coupled in parallel at the same time.

The inverter depicted in FIGS. 1 and 2 still has some technical problems, such as current distribution, malfunctioning, low efficiency and capacity. More details are elaborated as follows:

Because the static and dynamic characteristics of IGBTs are not always the same, controlling with direct parallel operation results in different current flowing through two IGBTs while turned on in a static condition or switching dynamically. As a result, current distribution in the IGBTs is not equal. In serious conditions, the IGBTs could overheat and burn out.

As the transistors 111 and 112 use the same set of control signal to pass through gate control circuits 131 and 132 and drive the IGBTs (referring to FIG. 2), if one IGBT is opened or the actuation circuit is abnormal (such as signal interruption), in terms of the parallel structure, as long as one IGBT is turned on normally (i.e., the transistor 111 is normal), the overall output actuation is not affected. The actual load current waveform is also the same as the normal signal. Hence malfunctioning of the IGBT cannot be detected, and protection of the IGBT is difficult. Isolation of the malfunction is also not easy. Moreover, when one IGBT malfunctions, excessive current could flow through another IGBT. When the malfunction is not detectable, the other IGBT could burn out. Reliability is thus lacking.

The power loss of the general inverter can be classified as conduction loss and switching loss (including turn-on losses and turn-off loss). In general, a higher switching frequency of the IGBT has a more desirable output waveform, but the power loss is also greater, and the overall efficiency is lower. For an inverter of a greater capacity, to maintain a high switching frequency to achieve a desired waveform output is difficult.

In term of capacity, the safety current of the IGBT must be reduced as the switching frequency increases. Moreover, the dividing current is not equal when the IGBTs are coupled in parallel. Hence the total safety current has to be reduced.

SUMMARY OF THE INVENTION

In view of the aforesaid problems, the primary object of the invention is to provide an improved interleaving control type inverter.

To achieve the foregoing object, the interleaving control type inverter according to the invention includes a waveform generator to generate a predetermined waveform; a plurality of first signal generators to receive the predetermined waveform and phase voltage to generate a first control signal and a second control signal corresponding to the phase of the phase voltage; a second signal generator to receive the predetermined waveform and generate a first alternating signal and a second alternating signal; a plurality of first multiplexers to receive the first alternating signal and process the first control signal to become a plurality of first control signals; a plurality of second multiplexers to receive the second alternating signal and process the second control signal to become a plurality of second control signals; and a plurality of power transistors that switch according to the first control signals and the second control signals.

In one aspect, the interleaving control type inverter according to the invention further includes a digital signal processor (DSP) to generate a first alternating signal; a second alternating signal; a plurality of first control signals corresponding to the phase voltage and a plurality of second control signals corresponding to the phase voltage; a complex programmable logic device (CPLD) to receive the first alternating signal, second alternating signal, first control signal corresponding to the phase voltage and second control signal corresponding to the phase voltage, and separate the first control signals and the second control signals; and a plurality of power transistors that switch according to the first control signals and the second control signals.

According to the principle and aspect of the invention, the unbalanced dividing current resulting from different IGBT characteristics may be resolved.

According to the principle and aspect of the invention, the abnormal signal of one power transistor or gate driver may be detected easily through the current waveform.

When the invention is adopted on a frequency converter of a large AC motor, not only is the switching frequency of each power transistor of the frequency converter reduced, but also an improved waveform output may be achieved.

According to the principle and aspect of the invention, the switching loss of the power transistor may be reduced, the overall efficiency increased, the failure rate of the inverter may be reduced and the total reliability increased.

According to the principle and aspect of the invention, the parallel capacity may be increased and the cost of the elements reduced.

The invention also may be adopted on DC to AC inverters of a constant frequency and voltage, or DC to AC converters of varying voltages and frequencies, or AC to DC converters.

The foregoing, as well as additional objects, features and advantages of the invention will be more readily apparent from the following detailed description, which proceeds with reference to the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DESCRIPTION OF THE PREFERRED EMBODIMENTS

Reference will now be made in detail to the embodiments of the invention, examples of which are illustrated in the accompanying drawings. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
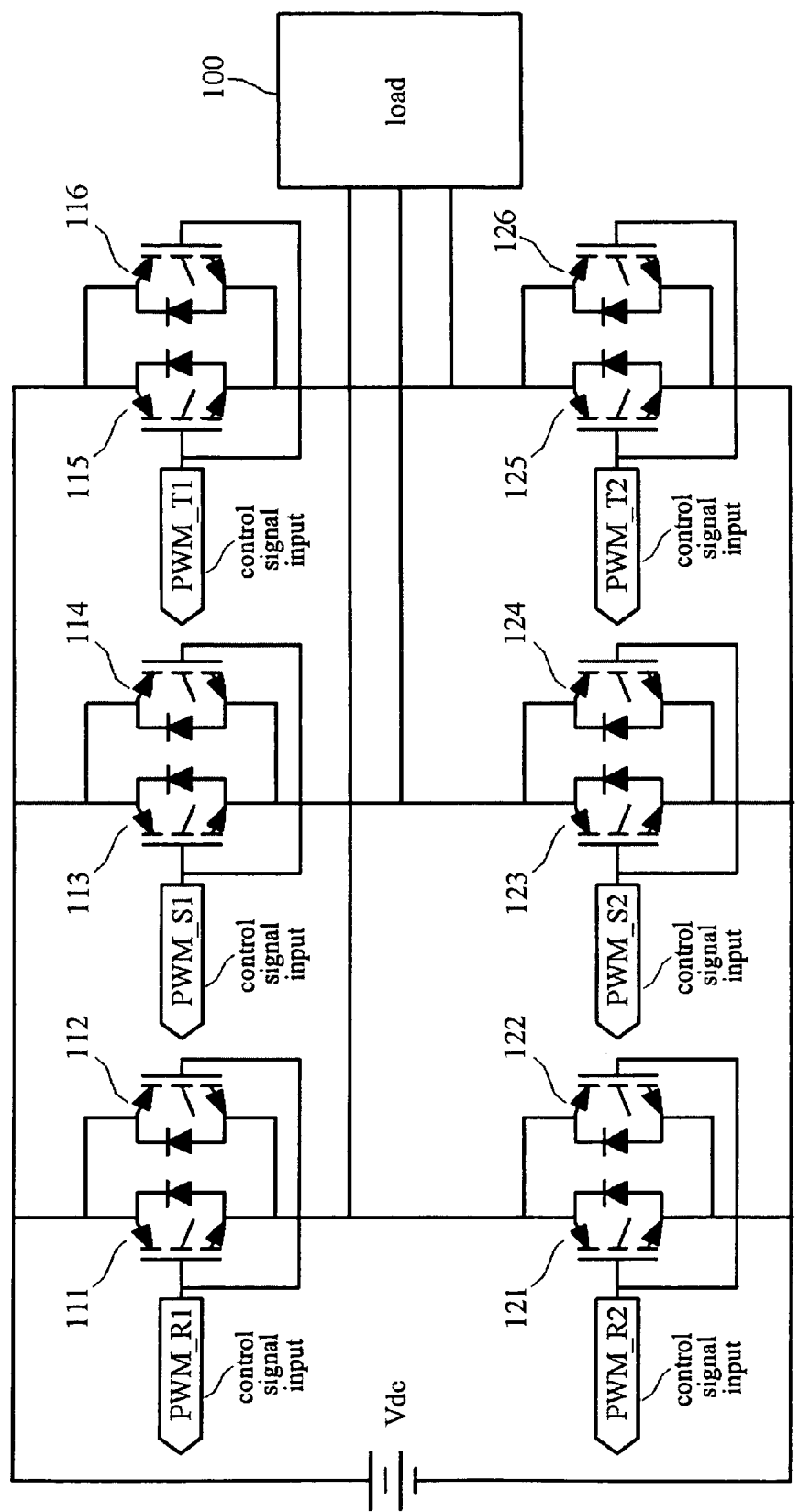
FIG. 1 is a circuit diagram of a conventional three-phase inverter.
Figure 2:
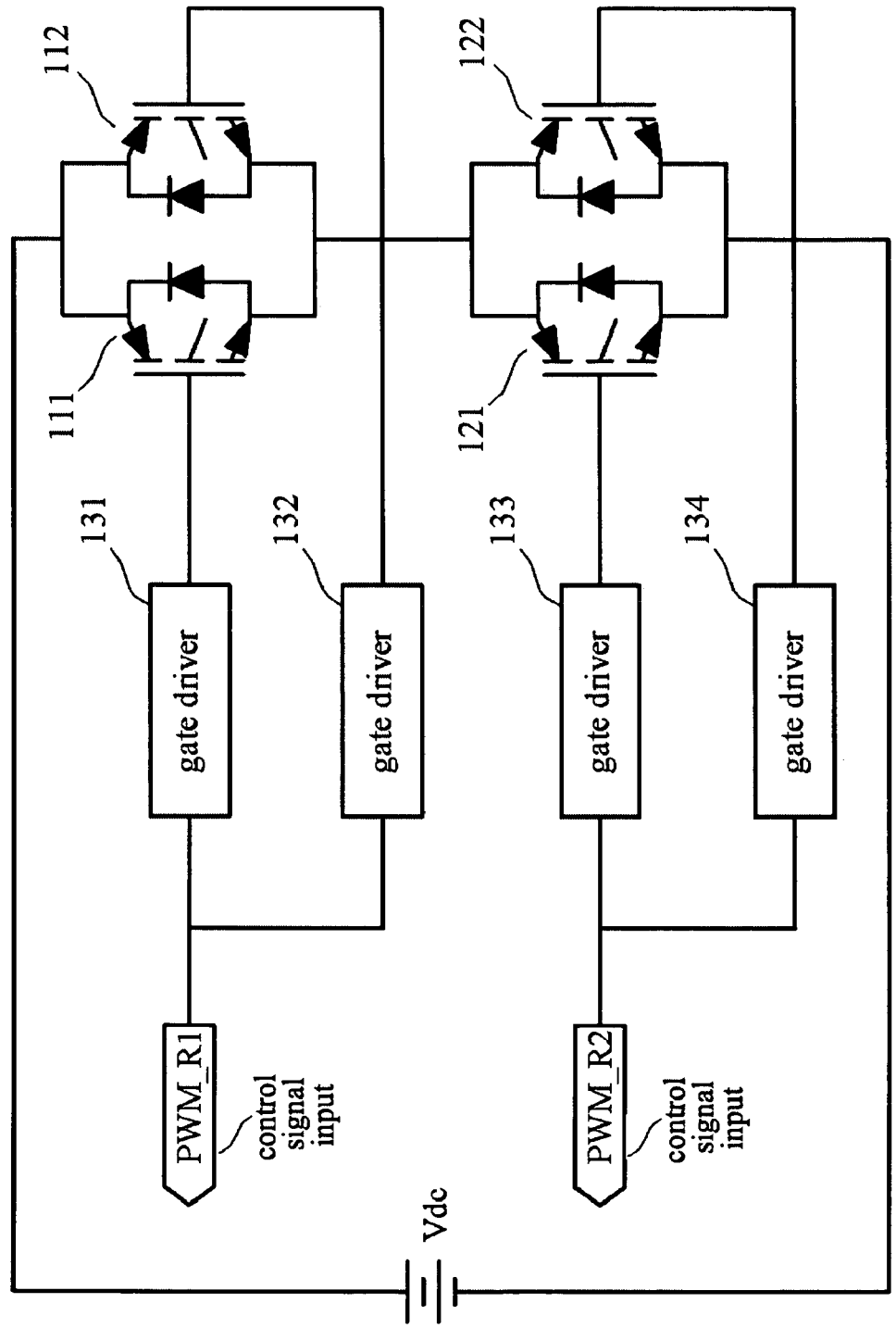
FIG. 2 is a circuit diagram of a gate driver of a conventional three-phase inverter.
Figure 3:
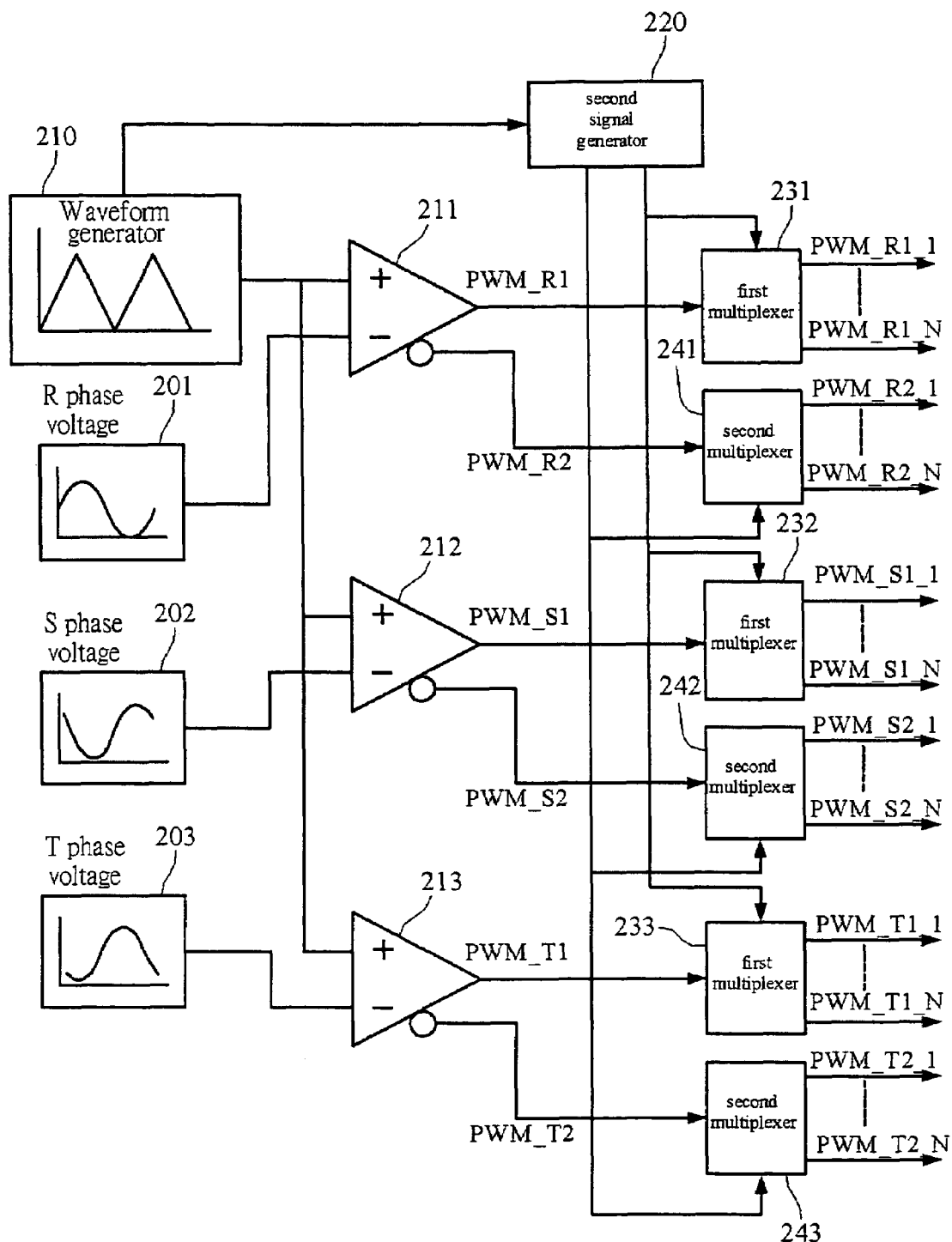
FIG. 3 is a block diagram of a first embodiment of the interleaving control type inverter of the invention.
Figure 4:
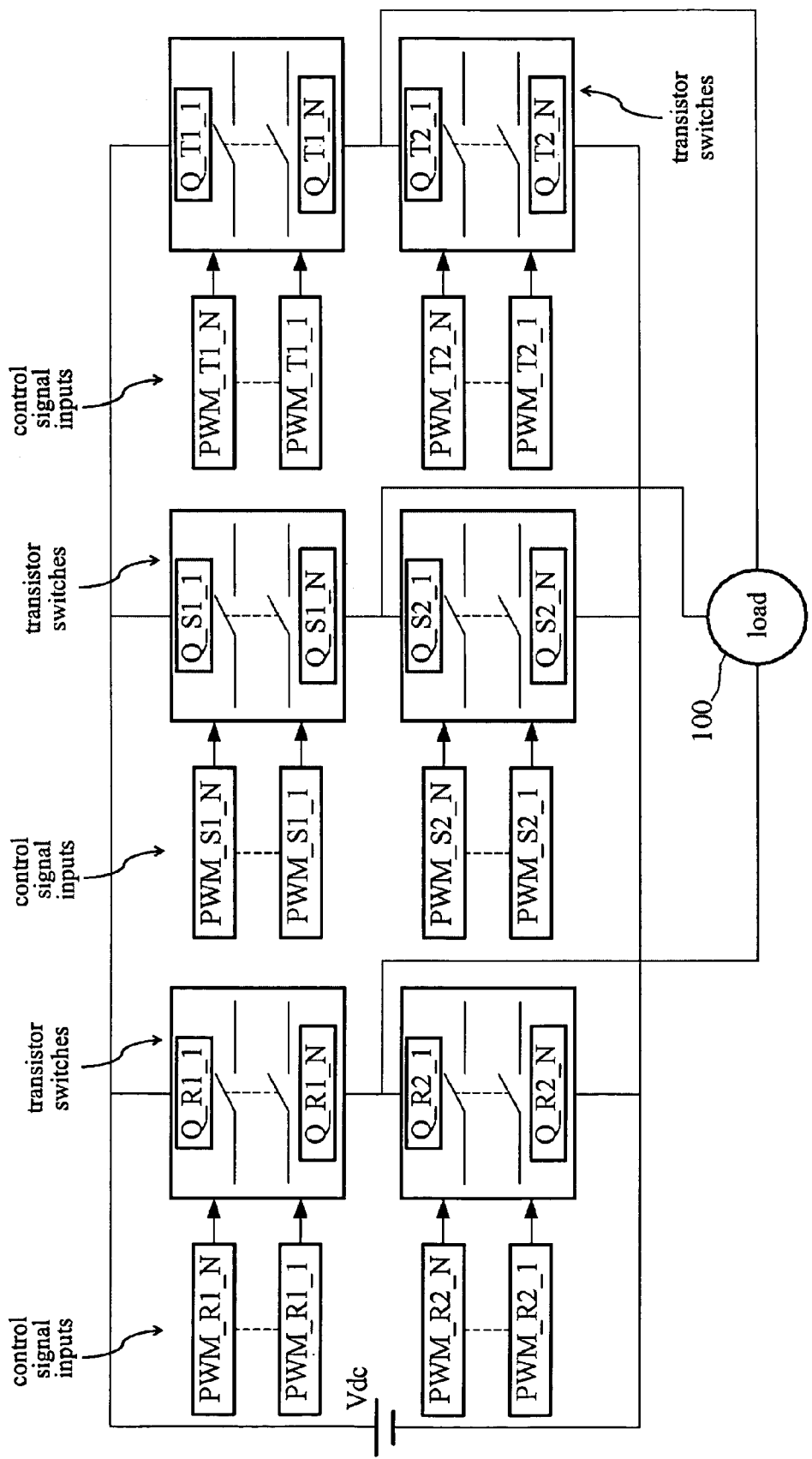
FIG. 4 is a block diagram of the parallel control structure of the first embodiment of the interleaving control type inverter of the invention.

Refer to FIG. 3 for a first embodiment of the invention. The interleaving control type inverter adopts a bipolar voltage switching, interleaving control and parallel structure. FIG. 4 illustrates a block diagram of the control signal to drive power transistors.

As shown in FIG. 3, the structure includes a waveform generator 210, a plurality of first signal generators 211~213, a second signal generator 220, a plurality of first multiplexers 231–233, and a plurality of second multiplexers 241–243.

The waveform generator 210 aims to generate a predetermined waveform, such as a triangular waveform generator for generating triangular waveforms.

The first signal generators 211~213 aim to receive the predetermined waveform generated by the waveform generator 210 and a corresponding R phase voltage 201, S phase voltage 202 and T phase voltage 203 to generate first control signals PWM_R1, PWM_S1 and PWM_T1, and second control signals PWM_R2, PWM_S2 and PWM_T2 that correspond to the phases of the voltages. It is known to those skilled in the art that the first control signals PWM_R1, PWM_S1 and PWM_T1 may be defined as upper arm control signals, while the second control signals PWM_R2, PWM_S2 and PWM_T2 may be defined as lower arm control signals, or vice versa. In this embodiment, the first signal generators 211~213 may be comparators.

The second signal generator 220 is connected to the waveform generator 210 to receive the predetermined waveform and generate a first interleaving signal and a second interleaving signal. In this embodiment, the second signal generator 220 may be an interleaving signal generator to determine the optimum interleaving time of the power transistor through the generated predetermined waveform, such as the triangular wave signal to generate the first interleaving signal and the second interleaving signal to ensure that the power transistor switches in a zero current condition.

The first multiplexers 231~233 aim to receive the first interleaving signal to process the first control signals PWM_R1, PWM_S1 and PWM_T1 to become a plurality of first control signals PWM_R1_1~PWM_R1_N, PWM_S1_1~N and PWM_T1_1~N. The second multiplexers 241~243 aim to receive the second interleaving signal to process the second control signals PWM_R2, PWM_S2 and PWM_T2 to become a plurality of second control signals PWM_R2_1~PWM_R2_N, PWM_S2_1~N and PWM_T2_1~N. In this embodiment, the first multiplexers 231~233 and the second multiplexers 241~243 may be N-stage multiplexers.

Referring to FIG. 4, the generated first control signals PWM_R1_1~PWM_R1_N drive a plurality of power transistors Q_R1_1~Q_R1_N that are coupled in parallel, the generated first control signals PWM_S1_1~PWM_S1_N drive a plurality of power transistors Q_S1_1~Q_S1_N that are coupled in parallel, and the generated first control signals PWM_T1_1~PWM_T1_N drive a plurality of power transistors Q_T1_1~Q_T1_N that are coupled in parallel. The generated second control signals PWM_R2_1~PWM_R2_N drive a plurality of power transistors Q_R2_1~Q_R2_N that are coupled in parallel, the generated second control signals PWM_S2_1~PWM_S2_N drive a plurality of power transistors Q_S2_1~Q_S2_N that are coupled in parallel, and the generated second control signals PWM_T2_1~PWM_T2_N drive a plurality of power transistors Q_T2_1~Q_T2_N that are coupled in parallel. Hence through the first control signals PWM_R1_1~PWM_R1_N, PWM_S1_1~N and PWM_T1_1~N and the second control signals PWM_R2_1~PWM_R2_N, PWM_S2_1~N and PWM_T2_1~N, the power transistors may be controlled to open and close and transform DC power Vdc to become three-phase AC power to drive a load 100. The power transistor may be an IGBT, a BJT or a MOSFET.

Figure 5:
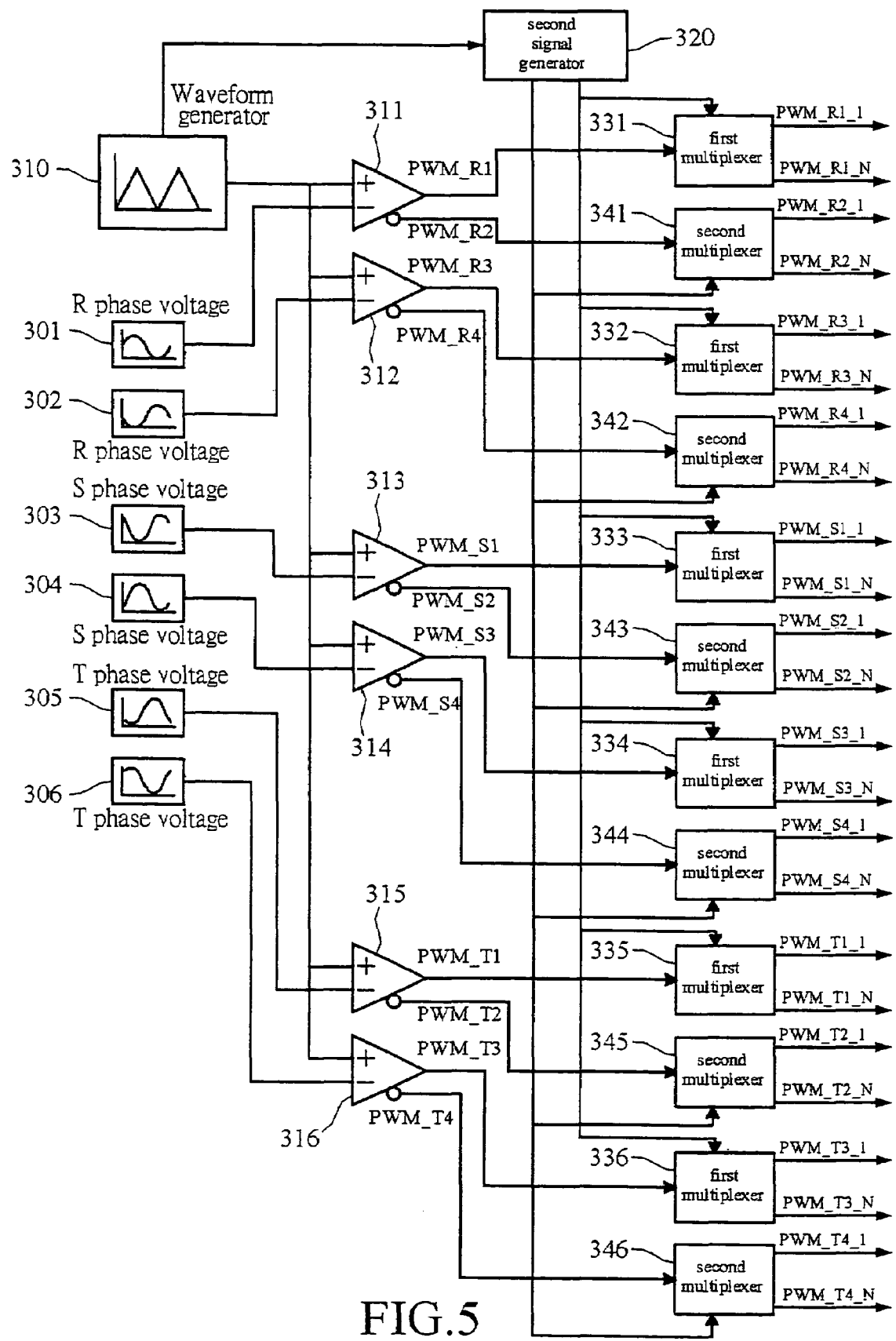
FIG. 5 is a block diagram of a second embodiment of the interleaving control type inverter of the invention.
Figure 6:
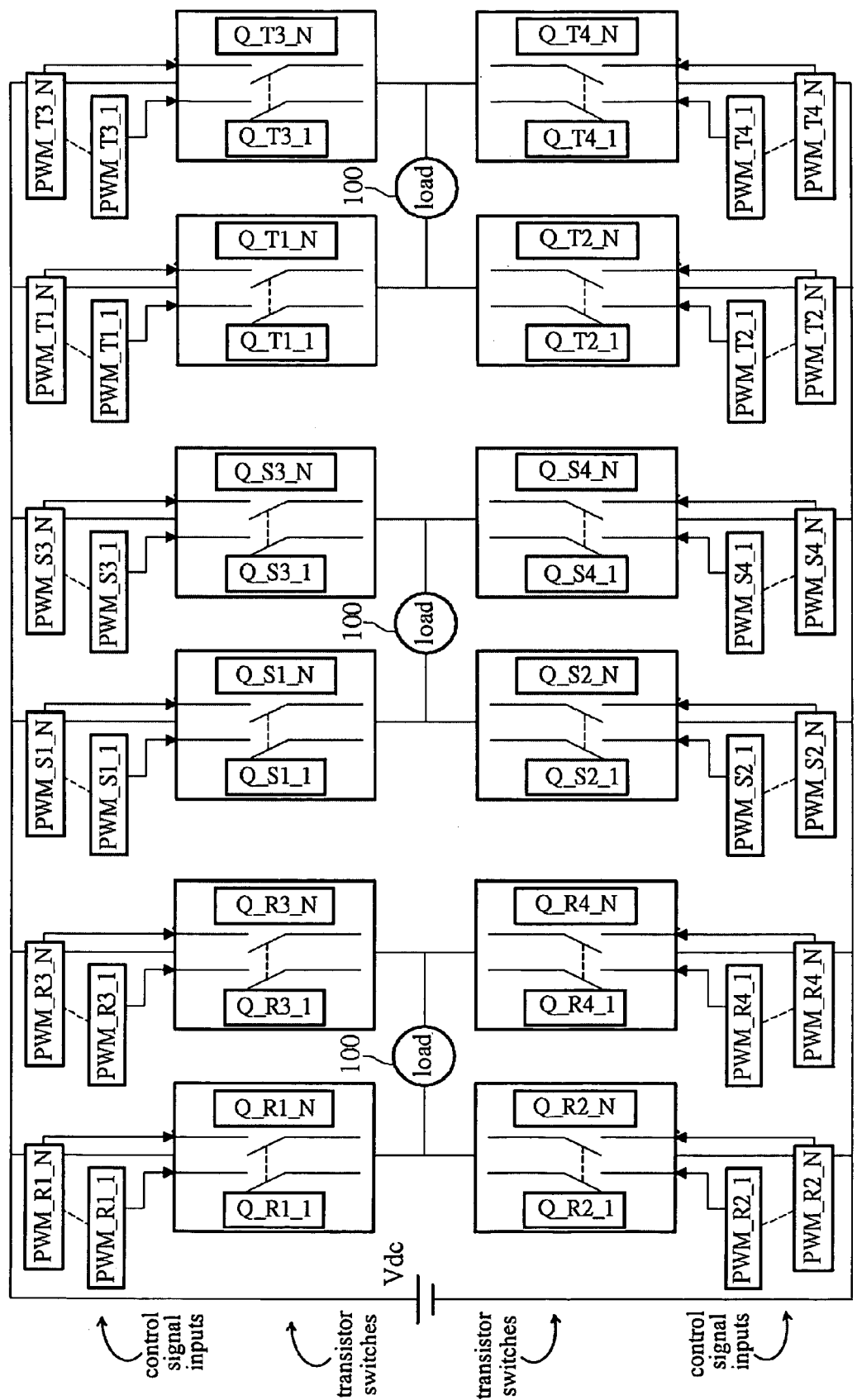
FIG. 6 is a block diagram of the parallel control structure of the second embodiment of the interleaving control type inverter of the invention.

Refer to FIG. 5 for a second embodiment of the invention. The interleaving control type inverter is a multi-stage parallel and unipolar voltage switching structure. FIG. 6 illustrates a block diagram of the control signal to drive power transistors.

As shown in FIG. 5, the structure includes a waveform generator 310, a plurality of first signal generators 311~316, a second signal generator 320, a plurality of first multiplexers 331~336, and a plurality of second multiplexers 341~346.

The waveform generator 310 aims to generate a predetermined waveform, such as a triangular waveform generator for generating triangular waveforms.

The first signal generators 311~316 aim to receive the predetermined waveform generated by the waveform generator 310 and corresponding R phase voltages 301~302, S phase voltages 303~304, and T phase voltages 304~305 to generate first control signals PWM_R1, PWM_R3, PWM_S1, PWM_S3, PWM_T1 and PWM_T3, and second control signals PWM_R2, PWM_R4, PWM_S2, PWM_S4, PWM_T2 and PWM_T4 that correspond to the phases of the voltages. The R phase voltage 301 and the R phase voltage 302 differ by one phase angle, such as 180 degrees. The S phase voltage 303 and the S phase voltage 304 differ by one phase angle, such as 180 degrees. The T phase voltage 305 and the T phase voltage 306 differ by one phase angle, such as 180 degrees. It is known to those skilled in the art that the first control signals PWM_R1, PWM_R3, PWM_S1, PWM_S3, PWM_T1 and PWM_T3 may be defined as upper arm control signals, and the second control signals PWM_R2, PWM_R4, PWM_S2, PWM_S4, PWM_T2 and PWM_T4 may be defined as lower arm control signals, or vice versa. In this embodiment, the first signal generators 311~316 may be comparators.

The second signal generator 320 is connected to the waveform generator 310 to receive the predetermined waveform and generate a first interleaving signal and a second interleaving signal. In this embodiment, the second signal generator 320 may be an interleaving signal generator to determine the optimum interleaving time of the power transistor through the generated predetermined waveform, such as the triangular wave signal to generate the first interleaving signal and the second interleaving signal to ensure that the power transistor switches in a zero current condition.

The first multiplexers 331~336 aim to receive the first interleaving signal to process the first control signals PWM_R1, PWM_R3, PWM_S1, PW_S3, PWM_T1 and PWM_T3 to become a plurality of first control signals PWM_R1_1~PWM_R1_N, PWM_R3_1~PWM_R3_N, PWM_S1_1~PWM_S1_N, PWM_S3_1~PWM_S3_N, PWM_T1_1~PWM_T1_N and PWM_T3_1~PWM_T3_N. The second multiplexers 341~346 aim to receive the second interleaving signal to process the second control signals PWM_R2, PWM_R4, PWM_S2, PWM_S4, PWM_T2 and PWM_T4 to become a plurality of second control signals PWM_R2_1~PWM_R2_N, PWM_R4_1~PWM_R4_N, PWM_S2_1~PWM_S2_N, PWM_S4_1~PWM_S4_N, PWM_T2_1~PWM_T2_N and PWM_T4_1~PWM_T4_N. In this embodiment, the first multiplexers 331~336 and the second multiplexers 341~346 may be N-stage multiplexers.

Refer to FIG. 6, the generated first control signals PWM_R1_1~PWM_R1_N drive a plurality of power transistors Q_R1_1~Q_R1_N that are coupled in parallel, the generated first control signals PWM_R3_1~PWM_R3_N drive a plurality of power transistors Q_R3_1~Q_R3_N that are coupled in parallel, the generated first control signals PWM_S1_1~PWM_S1_N drive a plurality of power transistors Q_S1_1~Q_S1_N that are coupled in parallel, the generated first control signals PWM_S3_1~PWM_S3_N drive a plurality of power transistors Q_S3_1~Q_S3_N that are coupled in parallel, the generated first control signals PWM_T1_1~PWM_T1_N drive a plurality of power transistors Q_T1_1~Q_T1_N that are coupled in parallel, and the first control signals PWM_T3_1~PWM_T3_N drive a plurality of power transistors Q_T3_1~Q_T3_N that are coupled in parallel. The generated second control signals PWM_R2_1~PWM_R2_N drive a plurality of power transistors Q_R2_1~Q_R2_N that are coupled in parallel, the generated second control signals PWM_R4_1~PWM_R4_N drive a plurality of power transistors Q_R4_1~Q_R4_N that are coupled in parallel, the generated second control signals PWM_S2_1~PWM_S2_N drive a plurality of power transistors Q_S2_1~Q_S2_N that are coupled in parallel, the generated second control signals PWM_S4_1~PWM_S4_N drive a plurality of power transistors Q_S4_1~Q_S4_N that are coupled in parallel, the generated second control signals PWM_T2_1~PWM_T2_N drive a plurality of power transistors Q_T2_1~Q_T2_N that are coupled in parallel, and the generated second control signals PWM_T4_PWM_T4_N drive a plurality of power transistors Q_T4_1~Q_T4_N that are coupled in parallel. Hence through the first control signals PWM_R1_1~PWM_R1_N, PWM_R3_1~PWM_R3_N, PWM_S_1~PWM_S1_N, PWM_S3_1~PWM_S3_N, PWM_T1_1~PWM_T1_N and PWM_T3_1~PWM_T3_N, and the second control signals PWM_R2_1~PWM_R2_N, PWM_R4_1~PWM_R4_N, PWM_S2_1~PWM_S2_N, PWM_S4_1~PWM_S4_N, PWM_T2_1~PWM_T2_N and PWM_T4_1~PWM_T4_N, the power transistors may be controlled to open and close and transform DC power Vdc to become three-phase AC power to drive a load 100. The power transistor may be an IGBT, a BJT or a MOSFET.

In the first and the second embodiments set forth above, the second signal generator may be a comparator, a current sensor, or software. The first and second multiplexers may be CPLD, TTL logic or FPGA.

Figure 7:
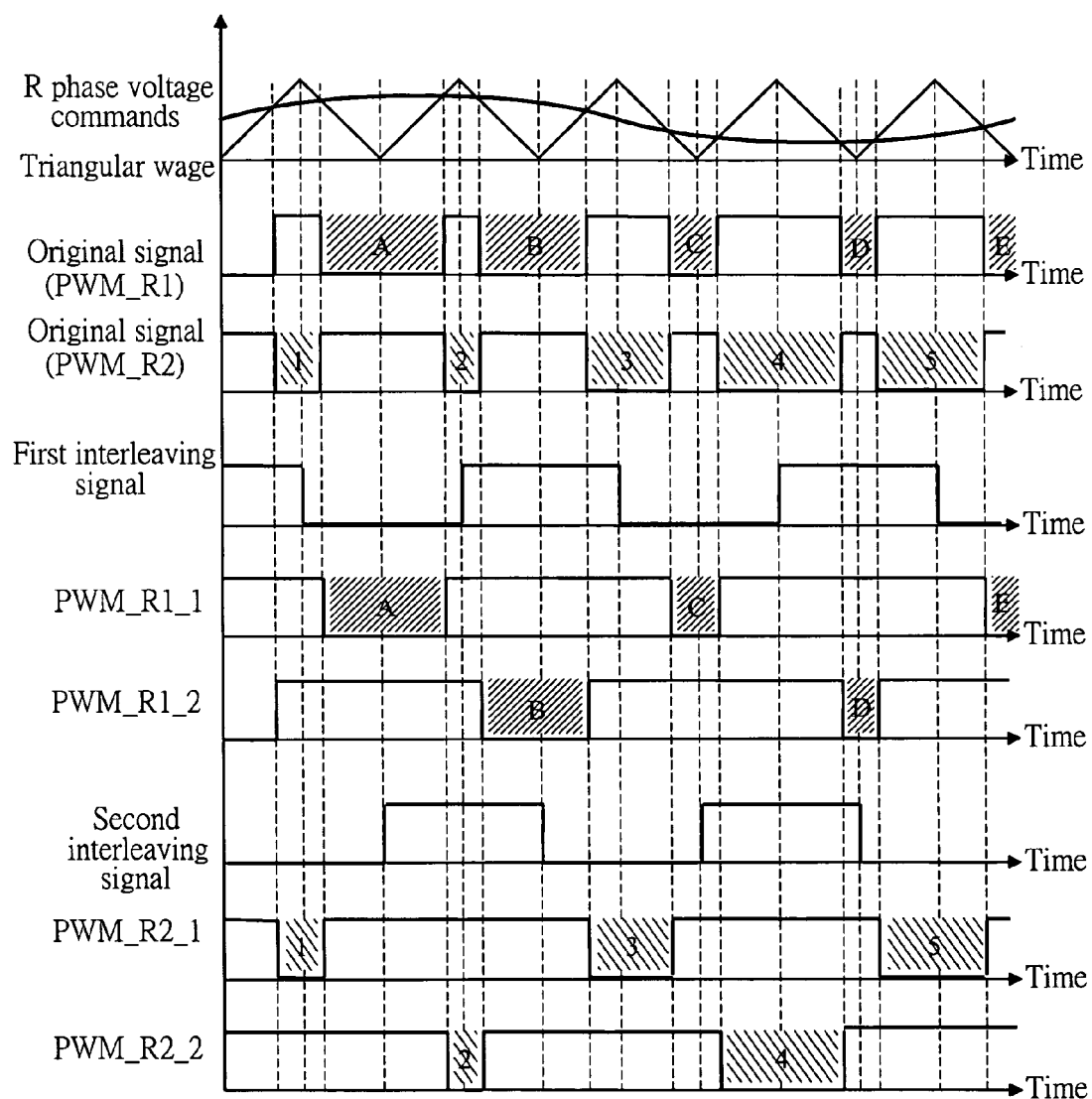
FIG. 7 is a control signal chart of the interleaving control type inverter of the invention.
Figure 8:
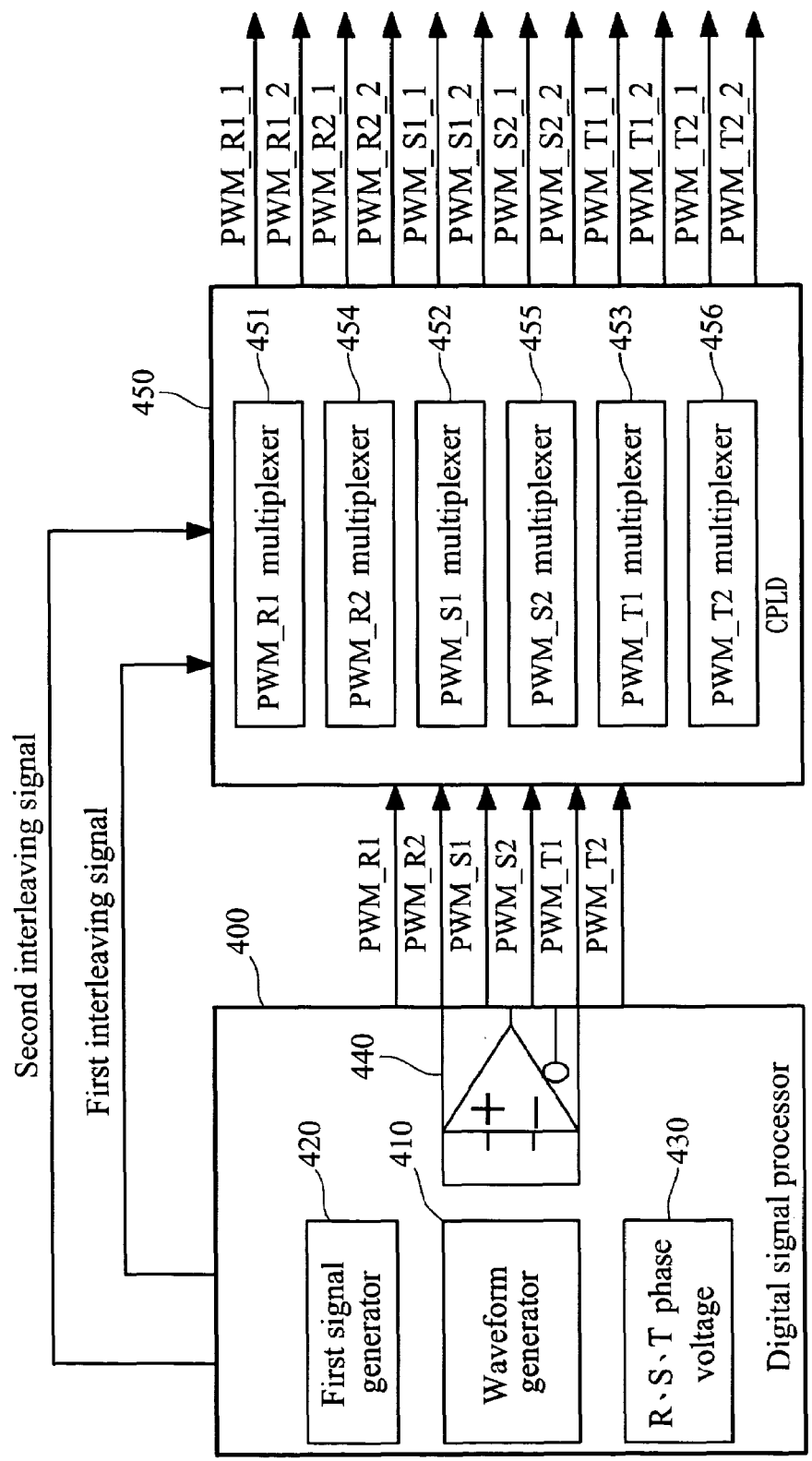
FIG. 8 is a block diagram of a third embodiment of the interleaving control type inverter of the invention.

Refer to FIG. 7 for the control signal chart of the interleaving control type inverter of the invention. The power transistors are Q_R1_1 and Q_R1_2 as examples. The prior turn-on time of the Q_R1_1 and Q_R1_2 is PWM_R1: A, B, C, D and E that turn on at the same time. If the turn-on time Q_R1_1 is changed to PWM_R1_1: A, C and E, and the turn-on time Q_R1_2 is changed to PWM_R1_2: B and D, the switching frequency of Q_R1_1 and Q_R1_2 can be reduced to one half.

Refer to FIG. 3 for a third embodiment of the alternating control in parallel according to the invention that employs DSP and CPLD. A DSP 400 is used to generate a first interleaving signal, a second interleaving signal, a plurality of first control signals corresponding to a phase voltage and a plurality of second control signals corresponding to the phase voltage. A CPLD 450 is used to receive the first interleaving signal, second interleaving signal, first control signals and second control signals, and separate the first control signals and the second control signals. The CPLD 450 includes a plurality of first multiplexers 451, 452 and 453, and a.plurality of second multiplexers 454, 455 and 456.

The first multiplexers 451, 452 and 453 receive the first interleaving signal and process the first control signal to become a plurality of first control signals.

The second multiplexers 454, 455 and 456 receive the second interleaving signal and process the second control signal to become a plurality of second control signals.

A triangular wave generator 410, R, S and T phase voltage 430 and a first signal generator 420 (or a digital comparator) are provided and may be constructed through software and hardware of a DSP controller. The first and the second interleaving signals also are generated by the DSP software. The first multiplexers 451, 452 and 453 and the second multiplexers 454, 455 and 456 are CPLDs to separate the first and second control signals to generate multi-stage control signals. The drawing shows a two-stage bipolar alternating parallel control method.

In the prior art, two parallel power transistors are controlled by one set of control signals. According to the invention, two parallel power transistors are controlled by two different sets of control signals. As the three-phase frequency converter adopts SPWM techniques to transform DC power to AC power of variable frequency and variable voltage, during energy conversion, switching loss is the biggest factor affecting the efficiency of the three-phase frequency converter. Hence improper alternating control signals result in increasing switching loss of the power transistor. The invention uses a digitized PWM carrier signal and synchronized alternating control signals generated by a software logic program, so it can alternately control parallel power transistors without increase additional switching loss.

Figure 9A:
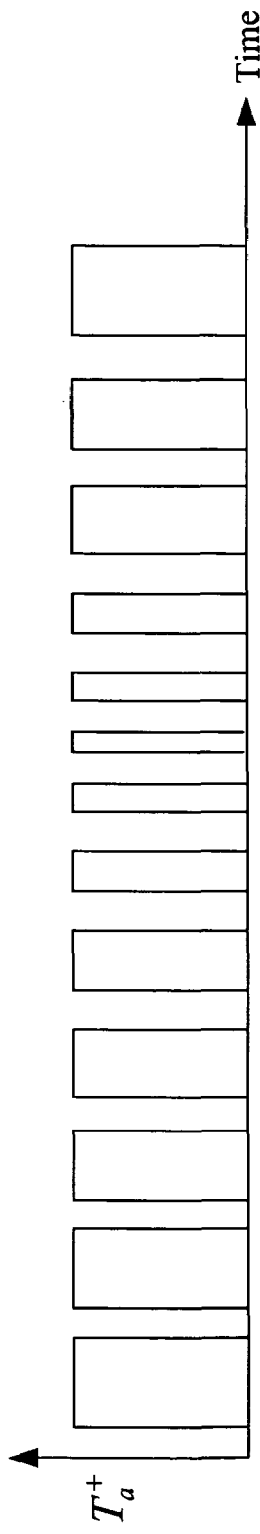
FIGS. 9A, 9B and 9C are charts showing separated control signals that are pulse width modulation signals according to the invention.
Figure 9B:
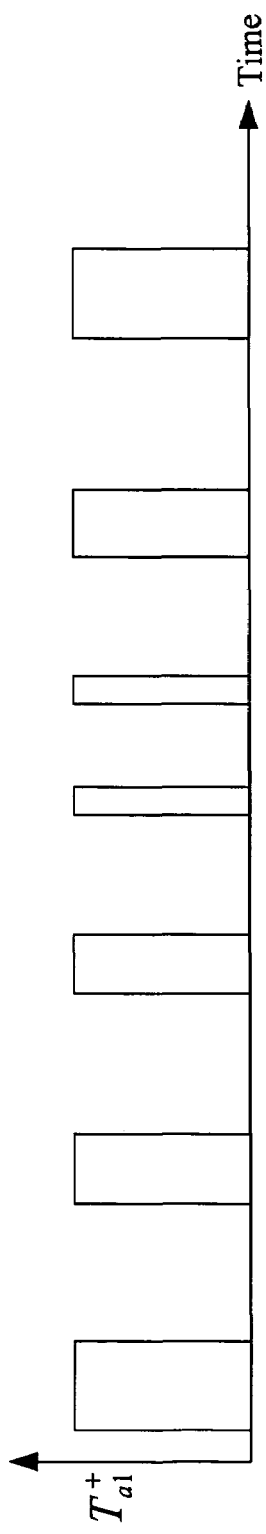
Figure 9C:
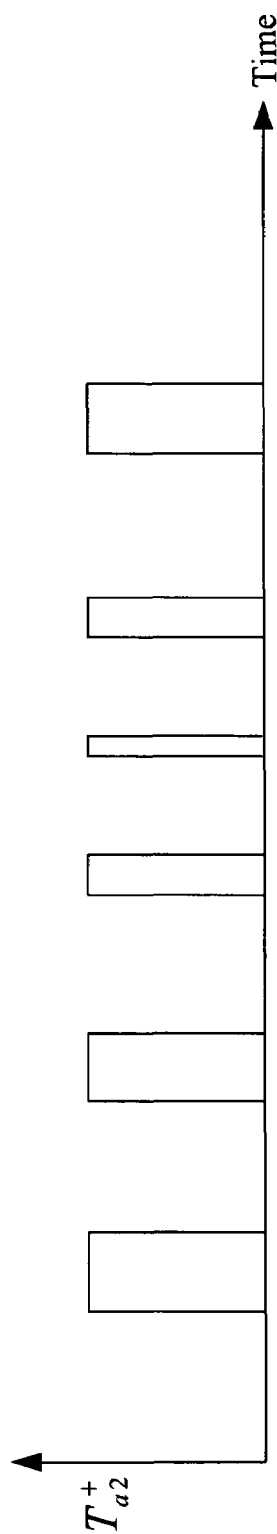

Refer to FIGS. 9A, 9B and 9C for the separated control signals, which are pulse width modulation signals, to explain the principle of the invention.

The parallel control decomposes each pulse width modulation signal, and may be indicated as follows:

$$T_x^+ = T_{x1}^+ + T_{x2}^+,\ T_x^- = T_{x1}^- + T_{x2}^-,\ \text{where } x=a,b,c.$$

As shown in FIGS. 9A, 9B and 9C, the decomposed pulse width modulation signal triggers respectively parallel power transistors. Total power loss is distributed to each parallel power transistor element. Hence power and switching frequency of the inverter increase, while motor harmonic current decreases. Electromagnetic interference may be improved. Meanwhile, iron-loss and copper-loss of the motor are reduced, and the problem of motor overheating may be prevented.

Figure 10:
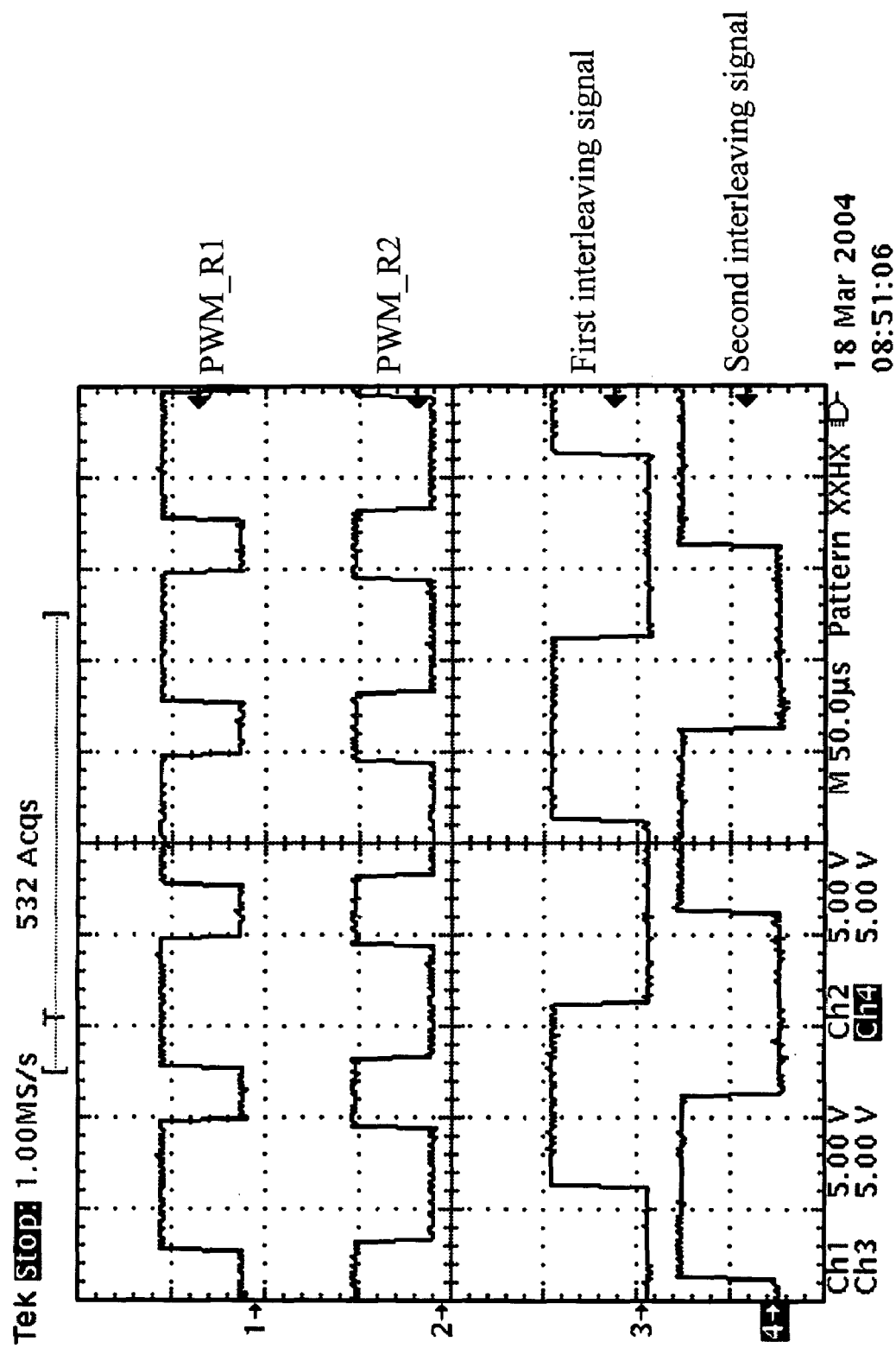
FIG. 10 is a signal chart showing a first control signal, a second control signal, a first alternating signal and a second alternating signal.
Figure 11:
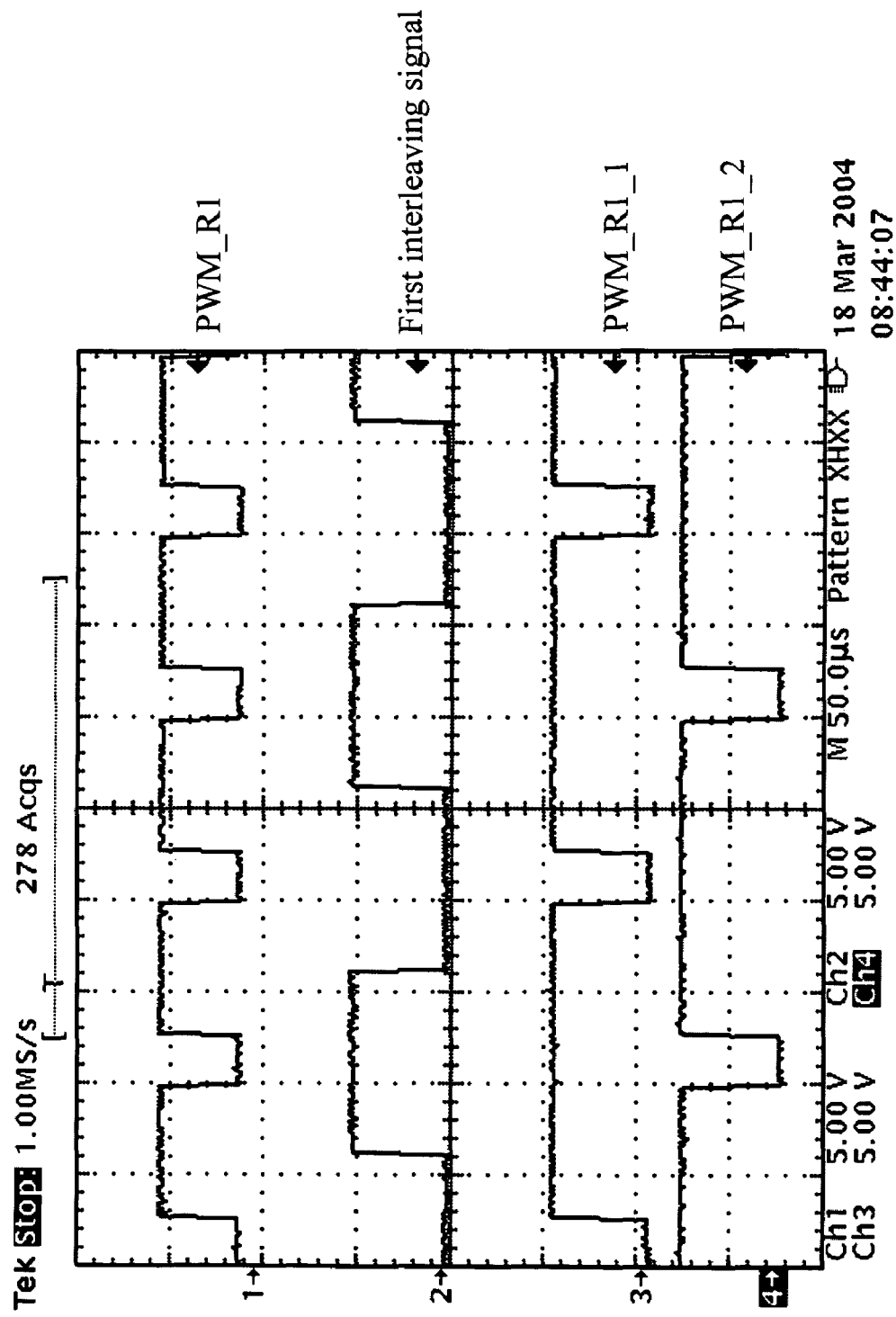
FIG. 11 is a chart showing the control signal after being separated by the first interleaving signal.
Figure 12:
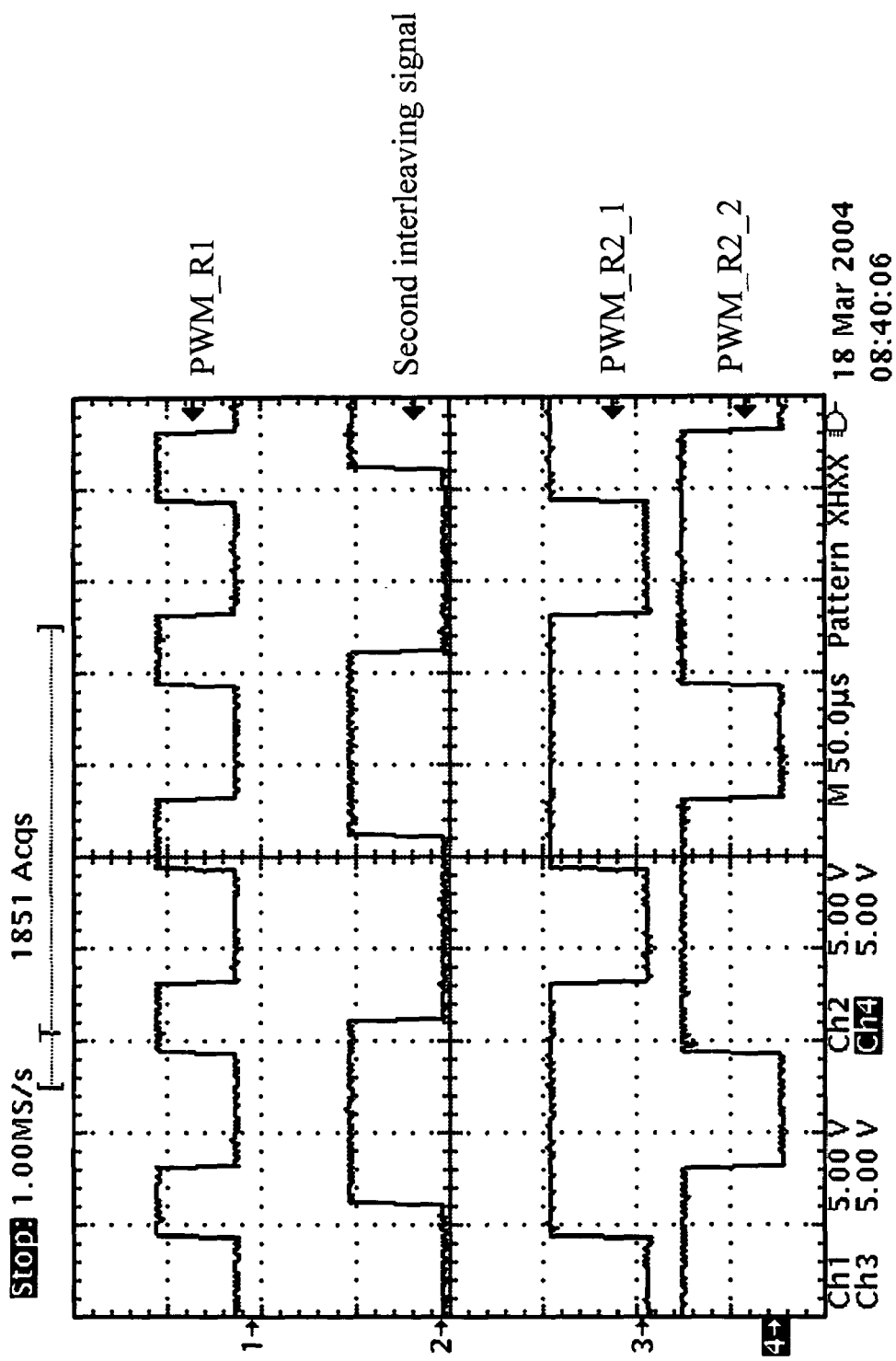
FIG. 12 is a chart showing the control signal after being separated by the second interleaving signal.

Take PWM_R1 and PWM_R2 as examples. Their original signals and alternating control signals are shown in FIG. 10. PWM1 and PWM2 are in active low operation. PWM_R1 is separated by the first alternating control signal to become two PWM_R1_1 and PWM_R1_2 signals, as shown in FIG. 11. PWM_R1_1 and PWM_R1_2 drive power transistors Q_R1_1 and Q_R1_2, respectively. PWM_R2 is separated by the second alternating control signal to become two signals PWM_R2_1 and PWM_R2_2 to drive power transistors Q_R2_1 and Q_R2_2, respectively, as shown in FIG. 12.

Figure 13:
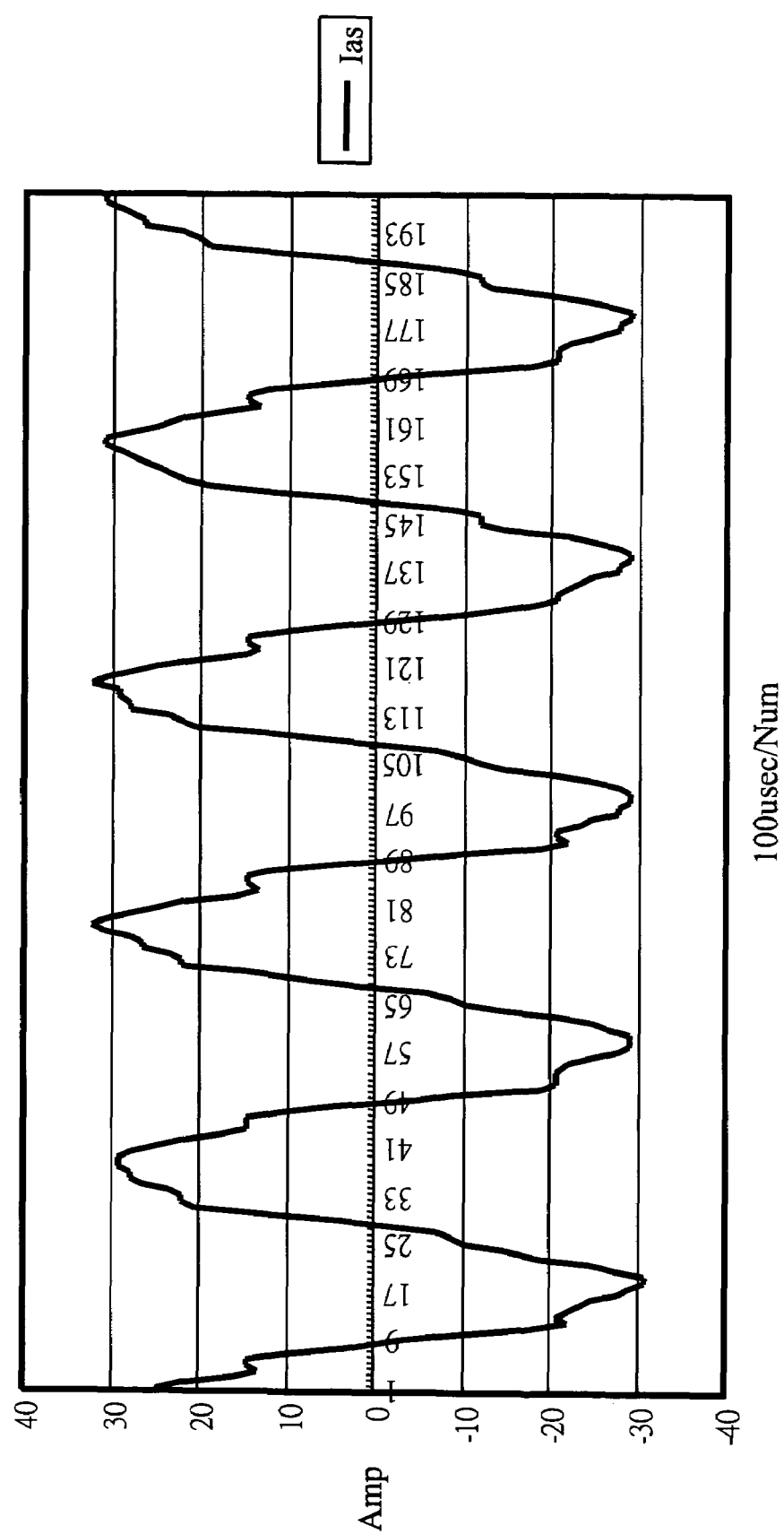
FIG. 13 is a chart showing a normal waveform of a frequency converter after having adopted the inverter control method of the invention.
Figure 14:
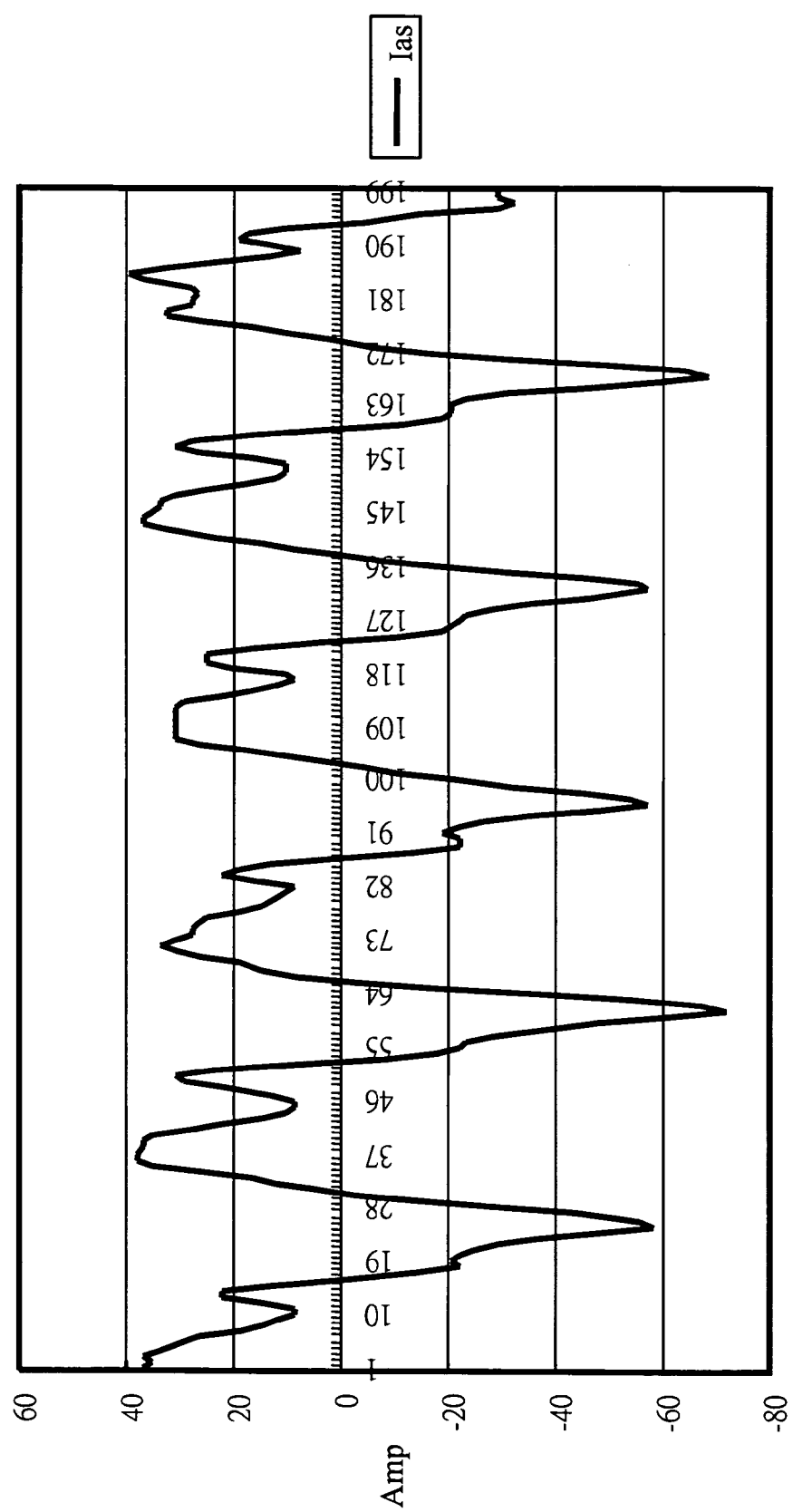
FIG. 14 is a chart showing an abnormal waveform of a frequency converter after having adopted the inverter control method of the invention.

The inverter control method disclosed in the invention may be adopted on a frequency converter. Take Q_R1_1, Q_R1_2, Q_R2_1 and Q_R2_2 as examples. The normal current waveform is shown in FIG. 13. In the event that any one set of signals in Q_R1_1, Q_R1_2, Q_R2_1 and Q_R2_2 is abnormal, the waveform becomes the one shown in FIG. 14.

The inverter control structure of the invention employs a multi-phase frequency converter using triangular wave modulation or an inverter transforming DC to AC under a constant frequency and a constant voltage, or an inverter transforming AC to DC. The alternating parallel control signal uses a triangular wave to determine the zero current switching point of the power transistor. By means of the invention, alternating control signals less than the number of the power transistors may be obtained. The optimal zero current switching points of the upper arm and lower arm power transistors may be grouped into two. Namely, the upper and lower arms have one optimum interleaving signal. Through the multiplexers, the upper and lower arm interleaving signals may be separated into N signals to achieve an N-stage power transistor parallel structure.

The inverter control structure of the invention employs a PWM triangular carrier signal and a matching software logic program to generate synchronized interleaving signals, and separate an upper arm control signal and a lower arm control signal to a plurality of upper arm and lower arm control signals through the synchronized interleaving signals. Based on the principle of the invention, the three-phase frequency converter needs only two synchronized interleaving signals to control the upper arm and the lower arm. This method is adaptable to unipolar and bipolar AC frequency converters and inverters.

The inverter control structure according to the invention can overcome the capacity problem of high power motor actuators. This is because digitized alternating PWM control signals are used to control IGBT parallel high power frequency converters (or inverters), and can thus prevent the disadvantages of the IGBT parallel frequency converter occurring with the prior art.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An interleaving control type inverter, comprising:
   a waveform generator to generate a waveform;
   a plurality of first signal generators to receive the waveform and respective phase voltages to generate first control signals and second control signals corresponding to the phase of the respective phase voltages;
   a second signal generator to receive the waveform and generate a first interleaving signal and a second interleaving signal;
   a plurality of first multiplexers to receive the first interleaving signal and process the first control signals;
   a plurality of second multiplexers to receive the second interleaving signal and process the second control signals; and
   a plurality of power transistors switching according to the first control signals and the second control signals.

2. The interleaving control type inverter of claim 1, wherein the waveform generator is a triangular waveform generator.

3. The interleaving control type inverter of claim 1, wherein each first signal generator comprises a comparator.

4. The interleaving control type inverter of claim 1, wherein the second signal generator is an interleaving signal generator.

5. The interleaving control type inverter of claim 4, wherein the interleaving signal generator is selected from the group consisting of a comparators, current sensors and software programs.

6. The interleaving control type inverter of claim 4, wherein the interleaving signal generator obtains an optimum interleaving time of the transistors through the waveform generated by the waveform generator to generate the first interleaving signal and the second interleaving signal to allow the transistors to switch in zero current.

7. The interleaving control type inverter of claim 1, wherein the multiplexers are N-stage multiplexers.

8. The interleaving control type inverter of claim 1, wherein the first multiplexers and the second multiplexers are selected from the group consisting CPLDs, TTL logic and FPGAs.

9. The interleaving control type inverter of claim 1, wherein the power transistors are selected from the group consisting of Insulated Gate Bipolar Transistors (IGBTs), BJTs, and MOSFETs.

10. The interleaving control type inverter of claim 1, wherein the phase voltages comprise three phases.

11. The interleaving control type inverter of claim 10, wherein there are three first signal generators corresponding respectively to the phases of the phase voltages.

12. The interleaving control type inverter of claim 1, wherein the phase voltages comprises three phases, each phase voltage including two phase voltages that have a selected phase difference.

13. The interleaving control type inverter of claim 12, wherein the selected phase difference is 180 degrees.

14. The interleaving control type inverter of claim 12, wherein there are six first signal generators corresponding respectively to the phases of the phase voltages.

15. An interleaving control type inverter, comprising:
    a digital signal processor to generate a first interleaving signal, a second interleaving signal, a plurality of first control signals corresponding to respective phase voltages and a plurality of second control signals corresponding to the respective phase voltages;
    a complex programmable logic device to receive the first interleaving signal, the second interleaving signal, the first control signals and the second control signals, and separate the first control signals and the second control signals; and
    a plurality of power transistors switching according to the first control signals and the second control signals,
    wherein the digital signal processor comprises:
        a waveform generator to generate a predetermined waveform;
        a plurality of first signal generators to receive the predetermined waveform and respective phase voltages to generate first control signals and second control signals corresponding to the phases of the respective phase voltages; and
        a second signal generator to receive the predetermined waveform and generate the first interleaving signal and the second interleaving signal.

16. The interleaving control type inverter of claim 15, wherein the waveform generator is a triangular waveform generator.

17. The interleaving control type inverter of claim 15, wherein there are three first signal generators corresponding respectively to the phases of the phase voltages.

18. The interleaving control type inverter of claim 15, wherein the second signal generator is an interleaving signal generator.

19. The interleaving control type inverter of claim 18, wherein the interleaving signal generator obtains an optimum interleaving time of the transistors through the waveform generated by the waveform generator to generate the first interleaving signal and the second interleaving signal to allow the transistors to switch in zero current.

20. An interleaving control type inverter comprising:
    a digital signal processor to generate a first interleaving signal, a second interleaving signal, a plurality of first control signals corresponding to respective phase voltages and a plurality of second control signals corresponding to the respective phase voltages;
    a complex programmable logic device to receive the first interleaving signal, the second interleaving signal, the first control signals and the second control signals, and separate the first control signals and the second control signals; and
    a plurality of power transistors switching according to the first control signals and the second control signals,
    wherein the complex programmable logic device comprises:
        a plurality of first multiplexers to receive the first interleaving signal and process the first control signals; and
        a plurality of second multiplexers to receive the second interleaving signal and process the second control signals.

21. The interleaving control type inverter of claim 20, wherein the multiplexers are N-stage multiplexers.

22. The interleaving control type inverter of claim 15, wherein the power transistors are selected from the group consisting of Insulated Gate Bipolar Transistors (IGBTs), BJTs, and MOSFETs.

* * * * *